United States Patent
Zheng et al.

(10) Patent No.: US 11,246,022 B2
(45) Date of Patent: Feb. 8, 2022

(54) BLUETOOTH HEADSET DEVICE AND COMMUNICATION METHOD FOR THE SAME

(71) Applicant: KUNSHAN TELINK SEMICONDUCTOR CO., LTD., Jiangsu Province (CN)

(72) Inventors: Mingjian Zheng, Shanghai (CN); Haipeng Jin, Shanghai (CN)

(73) Assignee: KUNSHAN TELINK SEMICONDUCTOR CO., LTD., Kunshan (CN)

( * ) Notice: Subject to any disclaimer, the term of this patent is extended or adjusted under 35 U.S.C. 154(b) by 0 days.

(21) Appl. No.: 17/144,499

(22) Filed: Jan. 8, 2021

(65) Prior Publication Data
US 2021/0211853 A1     Jul. 8, 2021

(30) Foreign Application Priority Data
Jan. 8, 2020 (CN) .......................... 202010016224.7

(51) Int. Cl.
| H04W 4/80 | (2018.01) |
| H04W 76/10 | (2018.01) |
| G08C 17/02 | (2006.01) |
| H04R 1/10 | (2006.01) |

(52) U.S. Cl.
CPC .............. *H04W 4/80* (2018.02); *G08C 17/02* (2013.01); *H04R 1/1016* (2013.01); *H04R 1/1041* (2013.01); *H04W 76/10* (2018.02); *H04R 2420/07* (2013.01)

(58) Field of Classification Search
CPC ................................ H04W 4/80; H04W 76/10
See application file for complete search history.

(56) References Cited

U.S. PATENT DOCUMENTS

| 8,527,013 B2 * | 9/2013 | Guba ................ H04M 1/72463 |
| | | 455/569.2 |
| 2017/0347180 A1 * | 11/2017 | Petrank ................... G10L 25/51 |

* cited by examiner

*Primary Examiner* — Tuan H Nguyen
(74) *Attorney, Agent, or Firm* — Nixon & Vanderhye P.C.

(57) ABSTRACT

Disclosed is a Bluetooth headset device and a communication method for the same. The method comprises: establishing by a first earpiece serving as a Bluetooth master device a Bluetooth connection with a data source device; establishing by the first earpiece and a second earpiece a wireless connection therebetween; and according to a preset cyclicity, exchanging by the first and second earpieces control information within a first time period, sending by one of the first and second earpieces that serves as a primary earpiece a Bluetooth transmission request to the data source device, and receiving by the first and second earpieces simultaneously Bluetooth data sent by the data source device in response to the request, within a second time period, wherein the role of the primary earpiece is switched between the first and second earpieces in an alternate mode or a switching on-demand mode based on the control information.

17 Claims, 5 Drawing Sheets

BLUETOOTH HEADSET DEVICE AND COMMUNICATION METHOD FOR THE SAME

CROSS-REFERENCE TO RELATED PATENT APPLICATION

The present disclosure claims the benefit of and priority to Chinese Patent Application No. 202010016224.7 filed on Jan. 8, 2020, the entire disclosure of which is incorporated by reference herein.

TECHNICAL FIELD

The present disclosure relates to the field of communication technologies, and in particular to a Bluetooth headset device and a communication method for the same.

BACKGROUND

With the advancement of society and development of communication technologies, the headsets have become an indispensable daily necessity in people's lives. By applying Bluetooth technology to the headset, the Bluetooth headset cancels the connection line between the earpieces and the data source device (for example, a smartphone) and thereby allows to use the headset in various ways freely.

A true wireless stereo (TWS) Bluetooth headset has completely got rid of the shackles of the connection line. The TWS headset includes a primary earpiece and a secondary earpiece, and the common communication method thereof is that the primary earpiece establishes a Bluetooth connection with the data source device and also establishes a Bluetooth connection with the secondary earpiece, so that the primary earpiece and the secondary earpiece implements data transmission through data forwarding. Exemplarily, the data source device sends audio data to the primary earpiece, and the primary earpiece forwards the audio data to the secondary earpiece, so that the primary earpiece and the secondary earpiece produce sound synchronously. Since there is no physical connection line between the primary earpiece and the secondary earpiece, the wearing experience of the TWS Bluetooth headset has been improved. However, the primary earpiece in this communication method needs to perform the complete Bluetooth data transmission (for example, receiving and forwarding) with both the data source device and the secondary earpiece, respectively. Thus, the overall amount of data transmitted by the primary earpiece is large, and thus the primary earpiece is subjected to a larger power consumption than the secondary earpiece, which results in an unbalanced power consumption between the two earpieces.

As to this, a different communication solution has been proposed. According to this solution, after the primary earpiece establishes a Bluetooth connection with the data source device, the secondary earpiece may perform the interception based upon relevant parameters of the Bluetooth connection received from the primary earpiece, while the data source device sends Bluetooth data to the primary earpiece, so as to simultaneously receive the Bluetooth data from the data source device, thereby eliminating the necessity to separately receive the Bluetooth audio data as forwarded from the primary earpiece. However, the secondary earpiece performs the interception passively in the currently known solution, and there is still an imbalance between the primary earpiece and the secondary earpiece. Moreover, the switching or backup between the primary earpiece and the secondary earpiece cannot be effectively realized.

SUMMARY

The present disclosure provides a Bluetooth wireless binaural headset and a communication method for the same, which can achieve a better balance between the primary earpiece and the secondary earpiece. Moreover, the primary earpiece and the secondary earpiece can both control the communication with the data device, and switching or backup therebetween can be performed at any time.

In a first aspect, the present disclosure provides a communication method for a Bluetooth headset device that includes a first earpiece and a second earpiece. The communication method includes: step S201 in which the first earpiece serving as a Bluetooth master device establishes a Bluetooth connection with a data source device; step S202 in which the first earpiece and the second earpiece establishes a wireless connection therebetween; and step S203 in which according to a preset cyclicity, the first earpiece and the second earpiece exchange control information for Bluetooth communication with the data source device within a first time period of each cycle, one of the first and second earpieces that serves as a primary earpiece sends a Bluetooth transmission request to the data source device, and the first earpiece and the second earpiece simultaneously receive, using the Bluetooth connection, Bluetooth data sent by the data source device in response to the Bluetooth transmission request, within a second time period of each cycle, where the role of the primary earpiece is switched between the first earpiece and the second earpiece in an alternate mode or a switching on-demand mode based on the control information, according to the preset cyclicity.

In some implementations, in the alternate mode, the step S203 includes that: the second earpiece sends second control information in a $(2N-1)^{th}$ cycle to the first earpiece within the first time period after the first earpiece sends first control information to the second earpiece, and the first earpiece sends the Bluetooth transmission request to the data source device within the second time period; and the first earpiece sends the first control information in a $(2N)^{th}$ cycle to the second earpiece within the first time period after the second earpiece sends the second control information to the first earpiece, and the second earpiece sends the Bluetooth transmission request to the data source device within the second time period, where N is a positive integer greater than 0.

In some implementations, in the switching on-demand mode based on the control information, the step S203 includes that: the one of the first earpiece and the second earpiece, after sending the control information to the other of the first earpiece and the second earpiece, receives the control information from the other of the first earpiece and the second earpiece within the first time period according to the preset cyclicity; and when the control information sent by the one of the first earpiece and the second earpiece includes a switching instruction, the other of the first earpiece and the second earpiece switches to serving as the primary earpiece to send the Bluetooth transmission request to the data source device in the second time period of the same cycle as the first time period.

In some implementations, the step S203 includes switching from the switching on-demand mode based on the control information to the alternate mode in response to mode change triggering condition information contained in the control information.

In some implementations, the control information includes the same information items in each cycle.

In some implementations, the control information includes connection status indication information for indicating whether the Bluetooth connection with the data source device is disconnected.

In some implementations, the control information includes synchronization information for synchronously receiving the Bluetooth data from the data source device.

In another aspect, the present disclosure provides a Bluetooth headset device including a first earpiece and a second earpiece, each of the first earpiece and the second earpiece including a processor and a memory that has a computer program executable by the processor stored therein, where when the processor executes the computer program, the first earpiece and the second earpiece are caused to implement the aforesaid communication method for a Bluetooth headset device.

In still another aspect, the present disclosure provides a non-transitory storage medium having a computer program stored therein, where when executed by a computer or a processor, the computer program causes the aforesaid communication method for the Bluetooth headset device to be implemented.

In yet another aspect, the present disclosure provides a computer program product, including instructions which, when executed, cause a computer to implement the aforesaid communication method for the Bluetooth headset device.

In still yet another aspect, the present disclosure provides a chip applicable to a Bluetooth headset device, where the chip includes at least one communication interface, at least one processor and at least one memory, with the communication interface, the memory, and the processor interconnected by at least one bus, and when the processor executes instructions stored in the memory, the Bluetooth headset device is caused to implement the aforementioned communication method for the Bluetooth headset device.

It should be noted that the aforesaid description is only an overview of the technical solutions of the present disclosure to understand technical solutions of the present disclosure more clear, thereby implementing the present disclosure in accordance with the content described in the specification. Specific implementations of the present disclosure will be given below to make the above and other objects, features, and advantages of the present disclosure more clearly understood.

DETAILED DESCRIPTION

Respective embodiments will now be described in detail with reference to the drawings. Whenever possible, the same or similar portions will be indicated by the same reference sign throughout the drawings. The reference to specific examples and implementations are for illustrative purposes and are not intended to limit the scope of the present disclosure or the claims.

Figure 1:
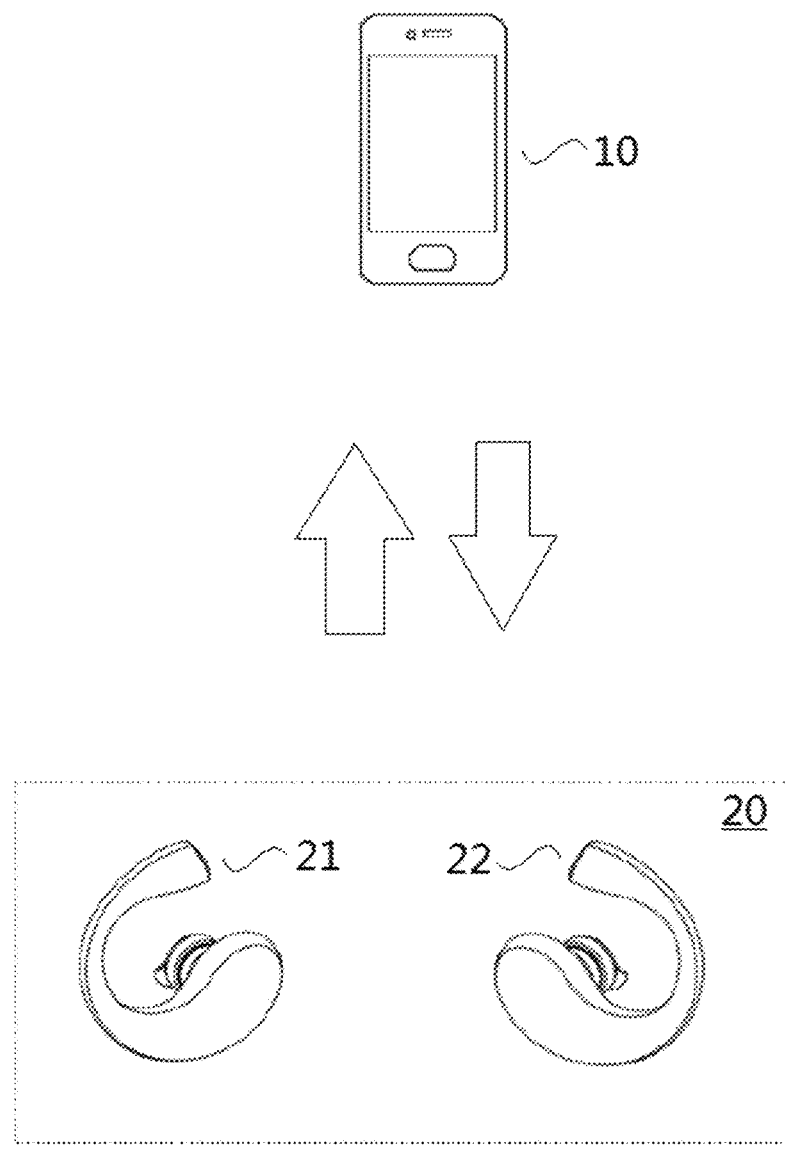
FIG. 1 is a system architecture diagram provided by an embodiment of the present disclosure.

FIG. 1 is a system architecture diagram provided by an embodiment of the present disclosure. As shown in FIG. 1, the system includes a data source device 10 and a Bluetooth headset device 20. The data source device 10 and the Bluetooth headset device 20 are connected each other via Bluetooth.

In the present disclosure, the Bluetooth headset device 20 is a headset device supporting the Bluetooth communication protocol which may be, but is not limited to, a classic Bluetooth protocol, a BLE low energy Bluetooth protocol or a newly launched Bluetooth protocol in the future, as long as it can support the technical solution of the present disclosure.

The Bluetooth headset device 20 of the present disclosure includes a first earpiece 21 and a second earpiece 22. The first earpiece 21 and the second earpiece 22 both include a Bluetooth module based on the Bluetooth communication protocol, and may further include a wireless communication module supporting other short-range wireless communication technologies. The first earpiece 21 and the second earpiece 22 may communicate with each other through a Bluetooth module or a wireless communication module. No connection line is provided between the first earpiece 21 and the second earpiece 22, which makes it portable and easy to use. The first earpiece 21 and the second earpiece 22 further include a speaker, and optionally a microphone.

In present disclosure, the data source device 10 may be any device with computing and processing capabilities. The data source device 10 includes a Bluetooth module based on the Bluetooth communication protocol, and further possesses an audio playback function and/or a voice communication function. For example, the data source device 10 may be a mobile phone, a computer, a television, a vehicle-mounted device, a wearable device, an industrial device, and the like.

The data source device 10 and the Bluetooth headset device 20 transmit Bluetooth data which includes audio data through a Bluetooth connection. The Bluetooth connection includes two physical links, with one being an asynchronous connection less (ACL) link, and the other being a synchronous connection oriented (SCO) link.

The ACL link is a basic connection for Bluetooth, and is generally adopted to transmit negotiation signaling of the connection type for maintaining the Bluetooth connection. The ACL link also supports one-way transmission of audio data. Exemplarily, when the data source device 10 sends audio data to the Bluetooth headset device 20 (i.e., the first earpiece 21 or the second earpiece 22) through the ACL link, the Bluetooth headset device 20 cannot send the audio data to the data source device 10 simultaneously. For example, in the scenario of listening to music, the ACL link is usually adopted for transmitting the audio data.

The SCO link is a connection technology supported by the Bluetooth baseband, which transmits data with reserved time slots. The SCO link supports two-way transmission of the audio data. Exemplarily, when the data source device 10 sends the audio data to the Bluetooth headset device 20 through the SCO link, the Bluetooth headset device 20 may also send the audio data to the data source device 10 through the SCO link. For example, in the scenario of making a phone call, the SCO link is usually adopted for transmitting the audio (voice) data.

It should be noted that the first earpiece 21 and the second earpiece 22 of the present disclosure are not limited as a left earpiece or a right earpiece. In some scenarios, the first earpiece 21 is the left earpiece, and the second earpiece 22 is the right earpiece. Whereas, in other scenarios, the first earpiece 21 is the right earpiece, and the second earpiece 22 is the left earpiece. Or, in some other scenarios, the first earpiece 21 and the second earpiece 22 may switch their roles (for example, exchange operations) according to needs or application scenarios.

At present, in response to the problems (that is, the large amount of transmission data and the unbalance in power consumption between the two earpieces) existing in the previous TWS Bluetooth headset communication method, a different solution is proposed. According to this solution, after the primary earpiece establishes a Bluetooth connection with the data source device, the secondary earpiece may perform the interception upon received relevant parameters of the Bluetooth connection from the primary earpiece, while the data source device sends Bluetooth data to the primary earpiece, so as to simultaneously receive the Bluetooth data from the data source device. However, the secondary earpiece performs the interception passively in the currently known solution, and there is still an imbalance between the primary earpiece and the secondary earpiece. Moreover, the switching or backup between the primary earpiece and the secondary earpiece cannot be effectively realized. Therefore, the embodiments of the present disclosure provide an improved communication method for the Bluetooth headset device.

The technical solution of the present disclosure will be described in detail below through specific embodiments. It should be noted that the following embodiments may exist alone or in combination with each other, and the same or similar content will not be repeated in different embodiments.

Figure 2:
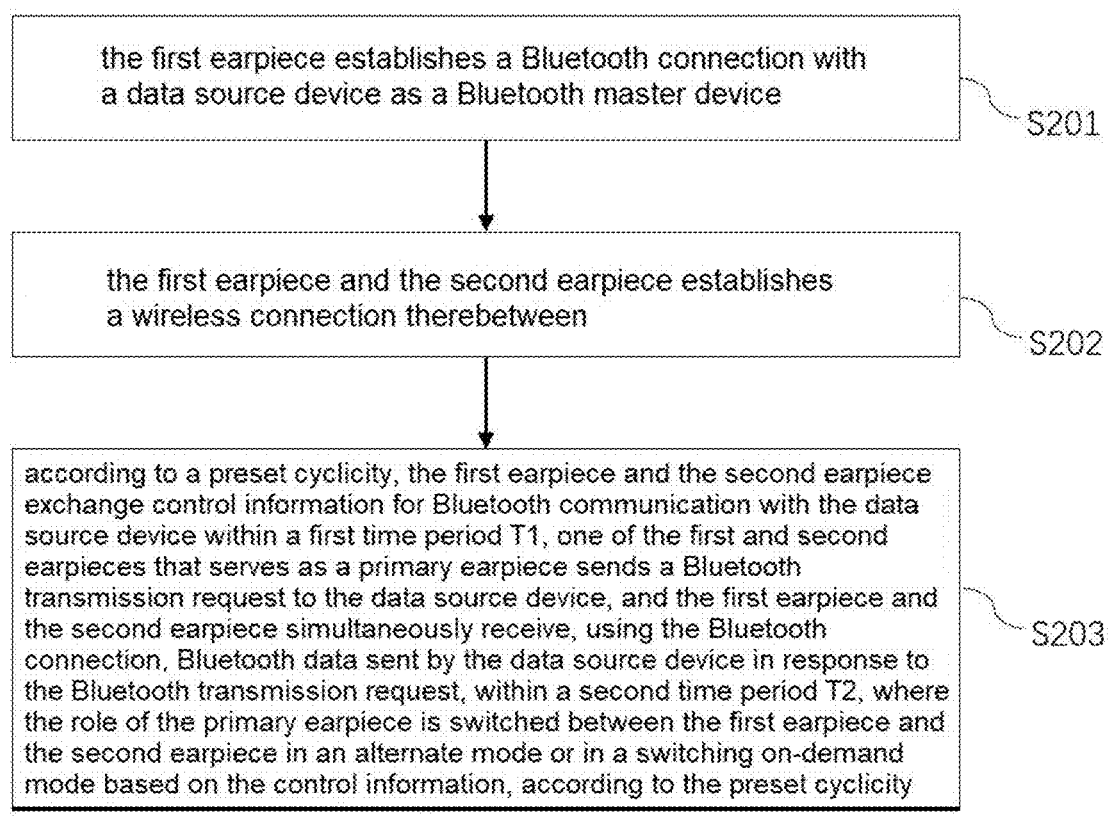
FIG. 2 is a schematic flowchart of a communication method for a Bluetooth headset device provided by an embodiment of the present disclosure.

FIG. 2 is a schematic flowchart of a communication method for a Bluetooth headset device provided by an embodiment of the present disclosure. As shown in FIG. 2, the method includes the following steps.

In step S201, the first earpiece establishes a Bluetooth connection with a data source device as a Bluetooth master device.

In some embodiments, the first earpiece establishes a connection with the data source device through a conventional (or standard) Bluetooth process of the Bluetooth module (for example, based on the classic Bluetooth protocol or the newly launched Bluetooth protocol in the future). The first earpiece herein serves as a Bluetooth master device and the data source device serves as a Bluetooth slave device.

In step S202, the first earpiece and the second earpiece establishes a wireless connection therebetween.

In some embodiments, the connection between the first earpiece and the second earpiece is established through the aforesaid Bluetooth module or another Bluetooth module (for example, based on the BLE low energy Bluetooth protocol). The another Bluetooth module herein and the aforesaid Bluetooth module in the step S201 may be integrated into a same Bluetooth chip for implementation, or may be independent chips. In some embodiments, the first earpiece and the second earpiece have been Bluetooth-paired before the step S201 and both have basic information required to communicate with each other. In other embodiments, the connection between the first earpiece and the second earpiece is established through a wireless communication module that supports other known short-range wireless communication technologies, which may for example, but is not limited to, be WIFI or ZigBee as long as the wireless transmission between the two earpieces described below can be supported.

In step S203, according to a preset cyclicity, the first earpiece and the second earpiece exchange control information for Bluetooth communication with the data source device within a first time period T1, one of the first and second earpieces that serves as a primary earpiece sends a Bluetooth transmission request to the data source device, and the first earpiece and the second earpiece simultaneously receive, using the Bluetooth connection, Bluetooth data sent by the data source device in response to the Bluetooth transmission request, within a second time period T2, where the role of the primary earpiece is switched between the first earpiece and the second earpiece in an alternate mode or in a switching on-demand mode based on the control information, according to the preset cyclicity.

Figure 3:
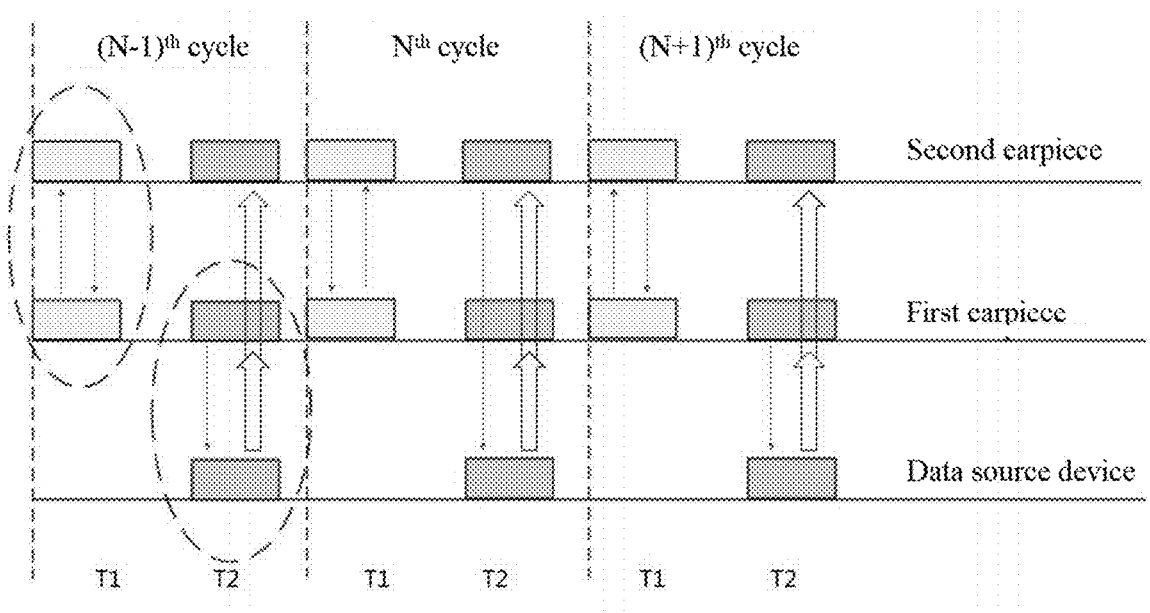
FIG. 3 is a schematic diagram of a time sequence for an alternate switching mode in a communication method for a Bluetooth headset device provided by an embodiment of the present disclosure.

In some implementations, the step S203 in the alternate mode includes that: the second earpiece sends second control information in a $(2N-1)^{th}$ cycle to the first earpiece within the first time period T1 after the first earpiece sends first control information to the second earpiece, and the first earpiece sends the Bluetooth transmission request to the data source device within the second time period T2; and the first earpiece sends the first control information in a $(2N)^{th}$ cycle to the second earpiece within the first time period T1 after the second earpiece sends the second control information to the first earpiece, and the second earpiece sends the Bluetooth transmission request to the data source device within the second time period T2, where N is a positive integer greater than 0. FIG. 3 is a schematic diagram of a time sequence for an alternate switching mode in the communication method for a Bluetooth headset device provided by an embodiment of the present disclosure.

In some other embodiments, in the switching on-demand mode based on the control information, the step S203 includes that: the one of the first earpiece and the second earpiece, after sending the control information to the other of the first earpiece and the second earpiece, receives the control information from the other of the first earpiece and the second earpiece within the first time period T1 according to the preset cyclicity; and when the control information sent by the one of the first earpiece and the second earpiece includes a switching instruction, the other of the first earpiece and the second earpiece switches to serving as the primary earpiece to send the Bluetooth transmission request to the data source device in the subsequent second time period T2. Optionally, the step S203 further includes that: when the control information sent by the one of the first earpiece and the second earpiece does not include a switching instruction, the other of the first earpiece and the second earpiece switches to serving as the primary earpiece to send the Bluetooth transmission request to the data source device in the subsequent second time period T2.

In still other embodiments, the role of the primary earpiece may be switched in combination of the alternate mode and the switching on-demand mode. As an example, the step S203 includes switching from the switching on-demand mode based on the control information to the alternate mode in response to mode change triggering condition information included in the control information. Illustratively, the mode change triggering condition may be a comparison result or change of the residual battery level, wearing state, Bluetooth signal strength and the like (which are obtained for example by sensors or other detection units and included in the control information) of the first earpiece and/or the second earpiece with respect to the respective preset values. For example, in the switching on-demand mode based on the control information, when the first earpiece and the second earpiece determine that the difference in the residual charge therebetween is below the preset threshold according to the control information as exchanged, they may both be changed to the alternate mode simultaneously.

In some embodiments, the preset cyclicity (including a preset cycle length, T1 and T2) is set as a fixed configuration when the Bluetooth headset device is shipped from the factory. An exemplary description of the preset cyclicity will be specifically given below, but the present disclosure is not limited to this.

As an example, the preset cycle length is set as 8 time slots, where the first time period T1 is set as the first 2 time slots and the second time period T2 is set as the last 6 time slots. In this way, within the first time period T1, the first earpiece may send the first control information to the second earpiece in a former time slot of the first time period T1, and the second earpiece may send the second control information to the first earpiece in a later time slot of the first period T1. In addition, within the second time period T2, the first earpiece or the second earpiece may send a transmission request for Bluetooth data to the data source device in a first time slot of the second period T2, and the data source device may simultaneously send a data packet with a maximum of 5 time slots (which may be a data packet with a length of 1, 3 or 5 time slots) to the first earpiece and the second earpiece in the last 5 time slots of the second time period T2. Since the maximum length of the existing Bluetooth data packet is 5 time slots (there are also data packets with a length of 1 or 3 time slots), the aforesaid Bluetooth communication method based on this exemplary preset cyclicity is compatible no matter whether the data source device supports the Bluetooth transmission of data packets with a length of 5 time slots, which does not increase the design complexity. As another example, the preset cycle length may be set as $2+6\times(N+1)$ time slots (N is a positive integer greater than 0), where the first time period T1 is set as the first 2 time slots and the second time period T2 is set as the last $6\times(N+1)$ time slots. That is, N data packets with a maximum length of 5 time slots may be transmitted in the second time period T2 of each cycle, thereby further achieving a highest transmission rate of Bluetooth data.

In still other embodiments, a plurality of preset cyclicities (such as the aforementioned exemplary preset cyclicities) are provided in advance when the Bluetooth headset device is shipped from the factory, and the Bluetooth headset device dynamically switches between the preset cyclicities according to specific needs or different scenarios.

In some embodiments, the control information (that is, the first control information sent by the first earpiece and the second control information sent by the second earpiece) includes the same information items in each cycle. Exemplarily, the first control information and the second control information have the same data packet format composed of a plurality of information fields based on the wireless communication technology (Bluetooth or other short-range wireless communication technology) adopted by the connection between the first earpiece and the second earpiece, and merely the respective information fields therein may be different from each other according to the current state of the corresponding earpiece (the first earpiece or the second earpiece) or the control to be performed on the other earpiece. As an example, when the first earpiece or the second earpiece does not need to notify the other earpiece of the indication information corresponding to a certain information field or needs to notify the other earpiece of the negative indication information, the corresponding information field is set as null or invalid; otherwise, the corresponding information field is set as valid. It should be understood that the specific indication manner of the information field may be any known manner, as long as the required state can be indicated, which is not particularly limited in the present disclosure. Since the first control information and the second control information include the same information items (e.g., adopting the same packet format), the operation differences before and after the first earpiece and the second earpiece switch their roles (i.e., the primary earpiece) in actually maintaining the Bluetooth connection (clock synchronization, frequency hopping synchronization) with the data source device and sending the Bluetooth transmission request to the data source device may be minimized, which thereby significantly reduces the design complexity of Bluetooth headset device.

However, the information items included in the first control information and the second control information may also be different according to the current state of the corresponding earpiece (the first earpiece or the second earpiece) or the control to be performed on the other earpiece. For example, the control data packet may do not include an information field requiring no instruction or requiring a negative instruction, which is not particularly limited in the present disclosure.

In some embodiments, the control information contains primary earpiece indication information for indicating whether the corresponding earpiece is currently serving as the primary earpiece, which is namely the earpiece that maintains the Bluetooth connection with the data source device and sends the Bluetooth transmission request to the data source device. Exemplarily, the primary earpiece indication information field in first control information sent by the first earpiece serving as the primary earpiece is valid, and the primary earpiece indication information field in second control information sent by the second earpiece not serving as the primary earpiece is null or invalid. In some embodiments, the primary earpiece indication information is configured to instruct whether to switch the role of the primary earpiece between the first and second earpieces in the aforesaid switching on-demand mode based on the control information. Exemplarily, if the primary earpiece indication information field in the first control information sent by the first earpiece serving as the primary earpiece indicates that the first earpiece does not serve as the primary earpiece, the second earpiece may determine this case as an instruction to switch to serving as the primary earpiece and further send in place of the first earpiece a transmission request for Bluetooth data to the data source device in the second time period T2 of the same cycle. When the primary earpiece indication information field in the first control information indicates that the first earpiece serves as the primary earpiece, the second earpiece may determine this case as not instructing to switch the role of the primary earpiece and keep intercepting and receiving the Bluetooth data sent by the data source device to the first earpiece, in the second period T2 according to the control information from the first earpiece. As an example, the primary earpiece indication information field in the second control information of the second earpiece (not serving as the primary earpiece currently) is null or invalid, and the first earpiece (serving as the primary earpiece currently) makes no response. In some embodiments, within the first period T1 of a next cycle after the second earpiece switches to serving as the primary earpiece according to the first control information, the first earpiece sends the first control information to the second earpiece after the second earpiece sends the second control information to the first earpiece. At this time, similarly, when the second control information of the second earpiece serving as the primary earpiece does not instruct to switch role of the primary earpiece, the second earpiece keeps sending the transmission request for Bluetooth data to the data source device within the second time period T2, and when the second control information instructs to switch the role of the primary earpiece, the first earpiece in place of the second earpiece sends the transmission request for Bluetooth data to the data source device within the second time period T2, which may be analogized for each cycle. In some embodiments, the instruction to switch the role of the primary earpiece may be triggered by a comparison result or change of the residual battery level, wearing state, Bluetooth signal strength and the like (which are not particularly limited in the present disclosure) with respect to the respective preset values. Because the first earpiece and the second earpiece transmit to each other the control information instructing to switch the role of the primary earpiece according to the preset cyclicity for receiving the Bluetooth data from the source data device simultaneously, and further the instruction for switching the role of the primary earpiece is implemented by changing only the primary device indication information and the operations of the first earpiece and the second earpiece change insignificantly after the switching of the role of the primary earpiece, the switching of the role of the primary earpiece between the first earpiece and the second earpiece can be easily implemented in real time with less signaling overhead.

In some embodiments, the control information includes connection status indication information for indicating whether the Bluetooth connection between a corresponding earpiece and the data source device is disconnected. Exemplarily, when the Bluetooth connection between the first earpiece and the data source device is disconnected (the connection may for example be disconnected automatically since the first earpiece goes beyond the Bluetooth connection coverage with the data source device, or the link between the first earpiece and the data source device is abnormal, or the first earpiece is about to run out; or the disconnection may be caused by the user's active operation or initiated by the data source device), the connection status indication field in the first control information sent by the first earpiece is null or invalid, otherwise the connection status indication field is valid. As an example, the connection status indication field in the control information sent by the second earpiece is null or invalid, because the second earpiece does not actually establish the Bluetooth connection with the data source device. In some embodiments, when the connection status indication information field in the first control information sent by the first earpiece serving as the primary earpiece indicates that the Bluetooth connection with the data source device has been disconnected, the second earpiece stops sending the second control information to the first earpiece, or stops intercepting to receive the Bluetooth data sent by the data source device, or automatically starts to establish a new Bluetooth connection to the data source device.

In some embodiments, the control information further includes synchronization information for synchronously receiving data packets from the data source device, which may include upper-layer Bluetooth protocol parameters such as clock information, frequency hopping information, and data packet format. Exemplarily, the synchronization information is merely included in the control information sent by the first earpiece to the second earpiece within T1 of the first cycle, and the synchronization information field is null or invalid in the control information sent by the second earpiece to the first earpiece within T1 of the first cycle and the control information exchanged within T1 of the subsequent cycle.

In some embodiments, the control information further includes reception status indication information for indicating whether the corresponding earpiece correctly receives the Bluetooth data from the data source device within T2 of the previous cycle.

In some embodiments, the Bluetooth data is audio data or voice data.

It should be understood that although the operations of the method of the present disclosure are described in a specific order in drawings, it does not require or imply that the operations must be performed in the specific order, or that the desired result can only be achieved if all the operations as shown are performed. Instead, the order of executing the steps as depicted in the flowchart can be changed, such as, the step S201 and the step S202. Additionally or alternatively, some steps may be omitted, multiple steps may be combined into one step for execution, and/or one step may be decomposed into multiple steps for execution. For example, the step S201 and the step S202 may be combined into one step to execute.

Figure 4:
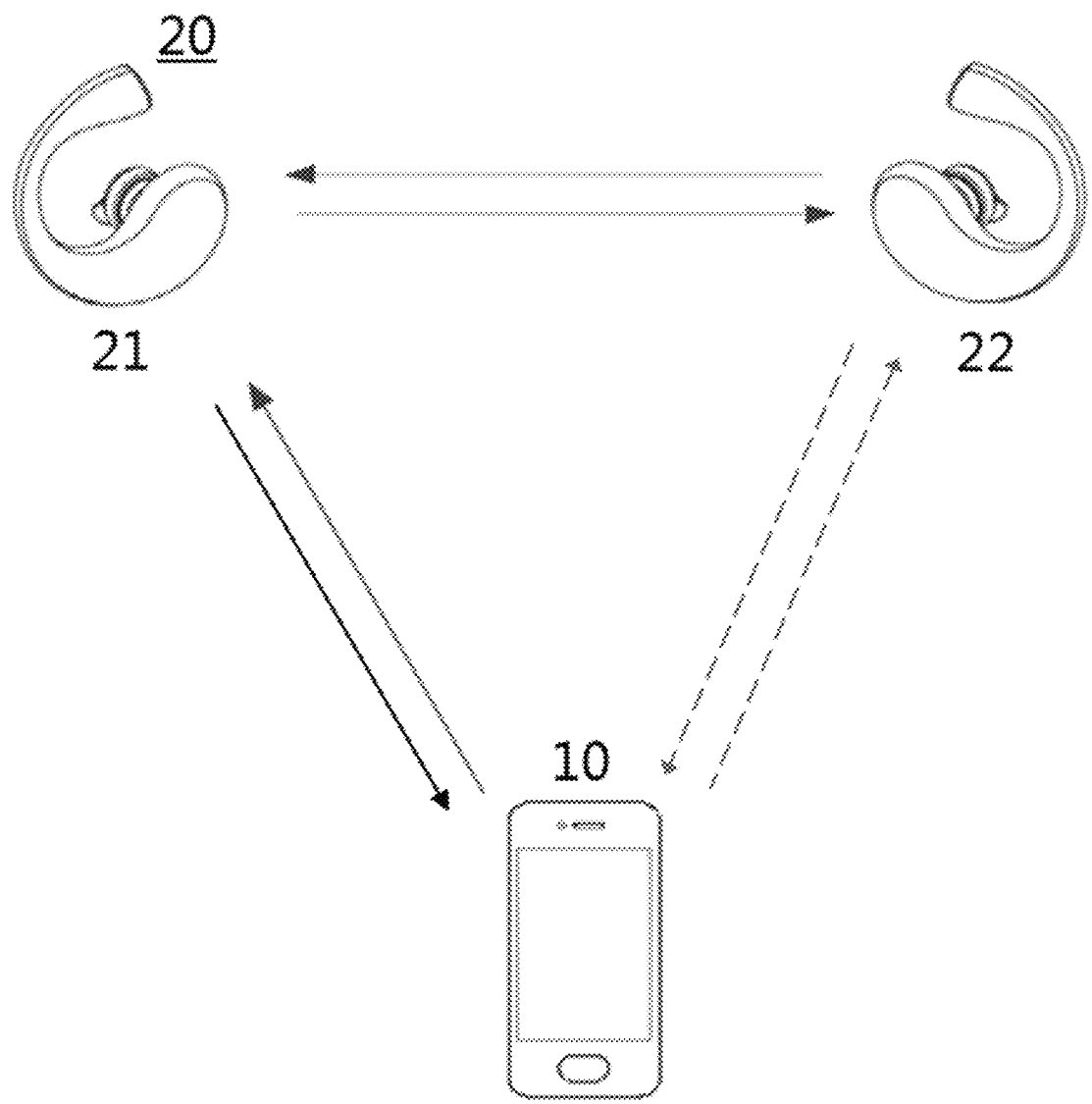
FIG. 4 is a schematic diagram of interaction between the data source device and the first and second earpieces of the Bluetooth headset device provided by an embodiment of the present disclosure.

FIG. 4 is a schematic diagram of interaction between the data source device 10 and the first earpiece 21 and second earpiece 22 of the Bluetooth headset device 20 provided by an embodiment of the present disclosure.

Figure 5:
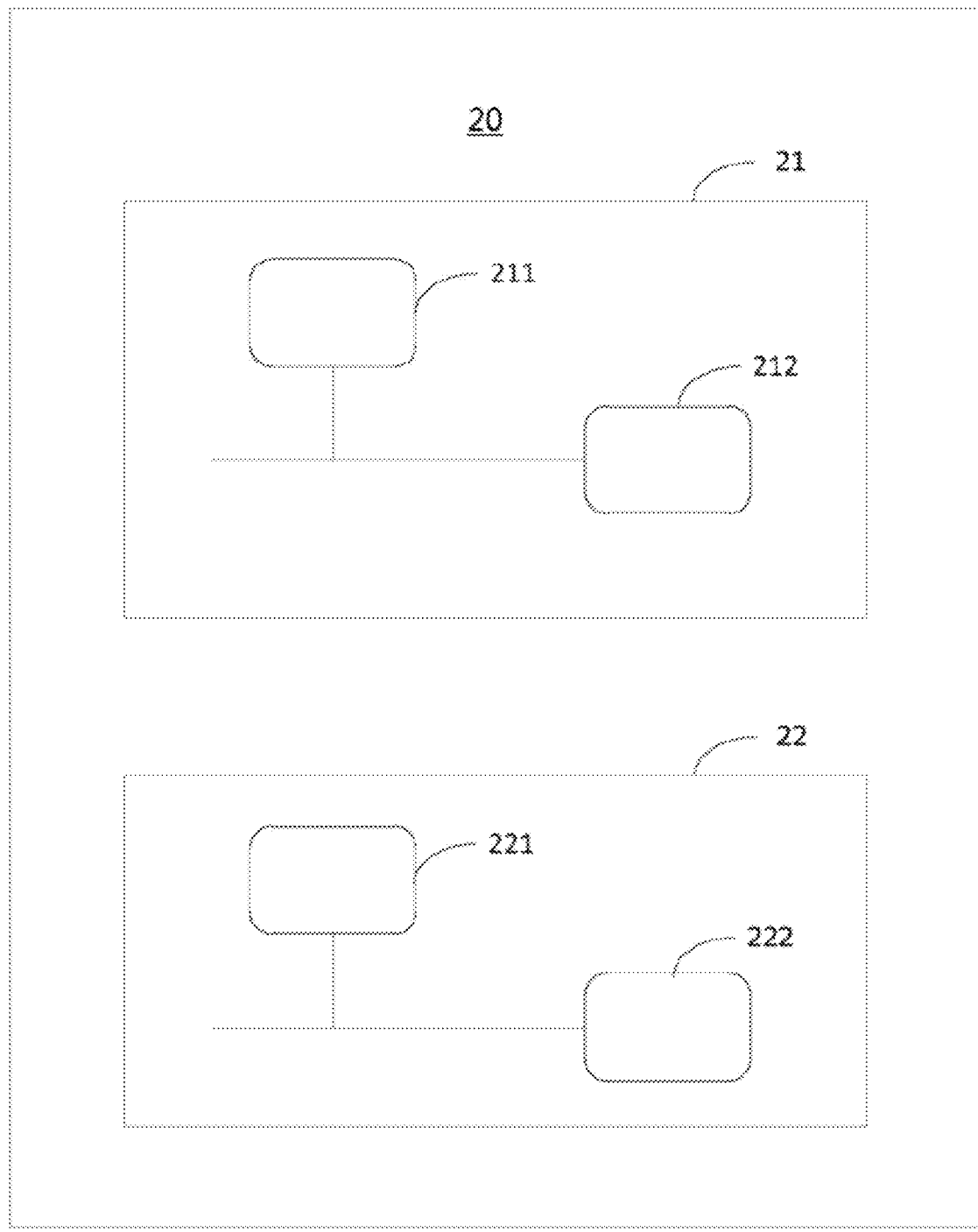
FIG. 5 is a schematic structural diagram of a Bluetooth headset device provided by an embodiment of the present disclosure.

FIG. 5 is a schematic structural diagram of a Bluetooth headset device provided by an embodiment of the present disclosure. As shown in FIG. 5, the Bluetooth headset device 20 of this embodiment includes a first earpiece 21 and a second earpiece 22. The first earpiece 21 includes a processor 211, a memory 212, and a computer program stored in the memory 212 and executable on the processor 211. As shown in FIG. 5, the second earpiece 22 includes a processor 221, a memory 222, and a computer program stored in the memory 222 and executable on the processor 221. Exemplarily, the memory 212 and the processor 211 may communicate with each other through a communication bus. When the processor 211 executes the computer program, the operations regarding the first earpiece 21 in the foregoing embodiment is implemented. Exemplarily, the memory 222 and the processor 221 may communicate with each other through a communication bus. When the processor 221 executes the computer program, the operations regarding the second earpiece 22 in the foregoing embodiment is implemented. Its implementation principle and technical effect are similar, and will not be repeated here.

Embodiments of the present disclosure provide a non-transitory storage medium having a computer program stored therein, which, when executed by a computer or a processor, causes the aforesaid communication method for the Bluetooth headset device to be implemented.

Embodiments of the present disclosure provide a computer program product, including instructions which, when executed, causes a computer to implement the aforesaid communication method for the Bluetooth headset device.

Embodiments of the present disclosure provides a chip applicable to a Bluetooth headset device, where the chip includes at least one communication interface, at least one processor and at least one memory, with the communication interface, the memory, and the processor interconnected by at least one bus, and when the processor executes instructions stored in the memory, the Bluetooth headset device is caused to implement the aforementioned communication method for the Bluetooth headset device.

In the embodiments of the present disclosure, the processor may be a general-purpose processor, a digital signal processor, an application specific integrated circuit, a field programmable gate array or other programmable logic devices, a discrete gate or transistor logic device, or a discrete hardware component, which can implement or execute the methods, steps, and logical block diagrams disclosed in the embodiments of the present disclosure. The general purpose processor may be a microprocessor or any conventional processor and the like. The steps of the method disclosed in combination with the embodiments of the present disclosure may be directly implemented by a hardware processor, or implemented by a combination of hardware and software modules in the processor.

In embodiments of the present disclosure, the memory may be a non-volatile memory, such as a hard disk drive (HDD) or a solid-state drive (SSD) and the like, or may also be a volatile memory, such as a random-access memory (RAM). The memory may be, but is not limited to, any other medium that can be used to carry or store desired program code in the form of instructions or data structures and that can be accessed by a computer. The memory in embodiments of the present disclosure may also be a circuit or any other device having a storage function and configured to store the program instructions and/or data.

It will be appreciated that one skilled in the art may make various modifications and variations to the present disclosure without departing from the scope of the present disclosure. Accordingly, if the modifications and variations of the present disclosure fall within the scope of the claims and their equivalents, the present disclosure is also intended to encompass such modifications and variations.

What is claimed is:

1. A communication method for a Bluetooth headset device including a first earpiece and a second earpiece, comprising:
    step S201 in which the first earpiece serving as a Bluetooth master device establishes a Bluetooth connection with a data source device;
    step S202 in which the first earpiece and the second earpiece establishes a wireless connection therebetween; and
    step S203 in which according to a preset cyclicity, within a first time period of each cycle, the first earpiece and the second earpiece exchange with each other control information for Bluetooth communication with the data source device, and within a second time period of each cycle, one of the first and second earpieces that serves as a primary earpiece sends a Bluetooth transmission request to the data source device, and the first and second earpieces simultaneously receive, using the Bluetooth connection, Bluetooth data sent by the data source device in response to the Bluetooth transmission request, wherein a role of the primary earpiece is switched between the first earpiece and the second earpiece in an alternate mode or a switching on-demand mode based on the control information, according to the preset cyclicity.

2. The communication method according to claim 1, wherein the step S203 in the alternate mode comprises:
    sending in a $(2N-1)^{th}$ cycle, by the second earpiece, second control information to the first earpiece within the first time period after the first earpiece sends first control information to the second earpiece, and sending, by the first earpiece, the Bluetooth transmission request to the data source device within the second time period; and
    sending in a $(2N)^{th}$ cycle, by the first earpiece, the first control information to the second earpiece within the first time period after the second earpiece sends the second control information to the first earpiece, and sending, by the second earpiece, the Bluetooth transmission request to the data source device within the second time period, wherein N is a positive integer greater than 0.

3. The communication method according to claim 1, wherein the step S203 in the switching on-demand mode based on the control information comprises:
    receiving, by the one of the first earpiece and the second earpiece that serves as the primary earpiece, the control information from the other of the first earpiece and the second earpiece, after sending the control information to the other of the first earpiece and the second earpiece, within the first time period; and
    if the control information sent by the one of the first earpiece and the second earpiece comprises a switching instruction, switching, by the other of the first earpiece and the second earpiece, to serving as the primary earpiece to send the Bluetooth transmission request to the data source device, within the second time period of the same cycle as the first time period.

4. The communication method according to claim 3, wherein the step S203 further comprises:
    if the control information sent by the one of the first earpiece and the second earpiece does not comprise the switching instruction, sending, by the one of the first earpiece and the second earpiece, the Bluetooth transmission request to the data source device in the second time period.

5. The communication method according to claim 3, wherein the control information comprises primary earpiece indication information for instructing whether to switch the role of the primary earpiece in the switching on-demand mode based on the control information.

6. The communication method according to claim 5, wherein the primary earpiece indication information in the control information sent by the primary earpiece is configured to instruct whether to switch the role of the primary earpiece in the switching on-demand mode based on the control information.

7. The communication method according to claim 6, wherein the primary earpiece determines whether to instruct to switch the role of the primary earpiece through the primary earpiece indication information according to information on at least one of a residual battery level, a wearing state, and a Bluetooth signal strength.

8. The communication method according to claim 1, wherein the step S203 comprises:
    switching from the switching on-demand mode based on the control information to the alternate mode in response to mode change triggering condition information included in the control information.

9. The communication method according to claim 8, wherein the mode change triggering condition information is information on at least one of a residual battery level, a wearing state, and a Bluetooth signal strength of at least one of the first earpiece and the second earpiece.

10. The communication method according to claim 1, wherein the preset cyclicity has a cycle length of 2+6N time slots, with the first time period being first 2 time slots and the second time period being last 6N time slots, wherein N is a positive integer greater than 0.

11. The communication method according to claim 1, wherein the control information comprises the same information items in each cycle.

12. The communication method according to claim 1, wherein the control information comprises connection status indication information for indicating whether the Bluetooth connection with the data source device is disconnected.

13. The communication method according to claim 12, wherein if the connection status indication information in the control information sent by the primary earpiece indicates that the Bluetooth connection with the data source device has been disconnected, the other of the first earpiece and the second earpiece stops sending the control information to the primary earpiece, or stops intercepting to receive the Bluetooth data sent by the data source device, or automatically starts to establish a new Bluetooth connection to the data source device.

14. The communication method according to claim 1, wherein the control information comprises synchronization information for synchronously receiving the Bluetooth data from the data source device.

15. The communication method according to claim 14, wherein the synchronization information is comprised only in the control information sent by the first earpiece to the second earpiece within the first period of a first cycle.

16. A Bluetooth headset device, comprising a first earpiece and a second earpiece each comprising a processor and a memory that stores a computer program executable by the processor, wherein when the processor executes the computer program, the first earpiece and the second earpiece are caused to implement a communication method for a Bluetooth headset device according to claim 1.

17. A non-transitory storage medium having a computer program stored therein, wherein when executed by a computer or a processor, the computer program causes a communication method for a Bluetooth headset device according to claim 1 to be implemented.

* * * * *